United States Patent Office 3,082,786
Patented Mar. 26, 1963

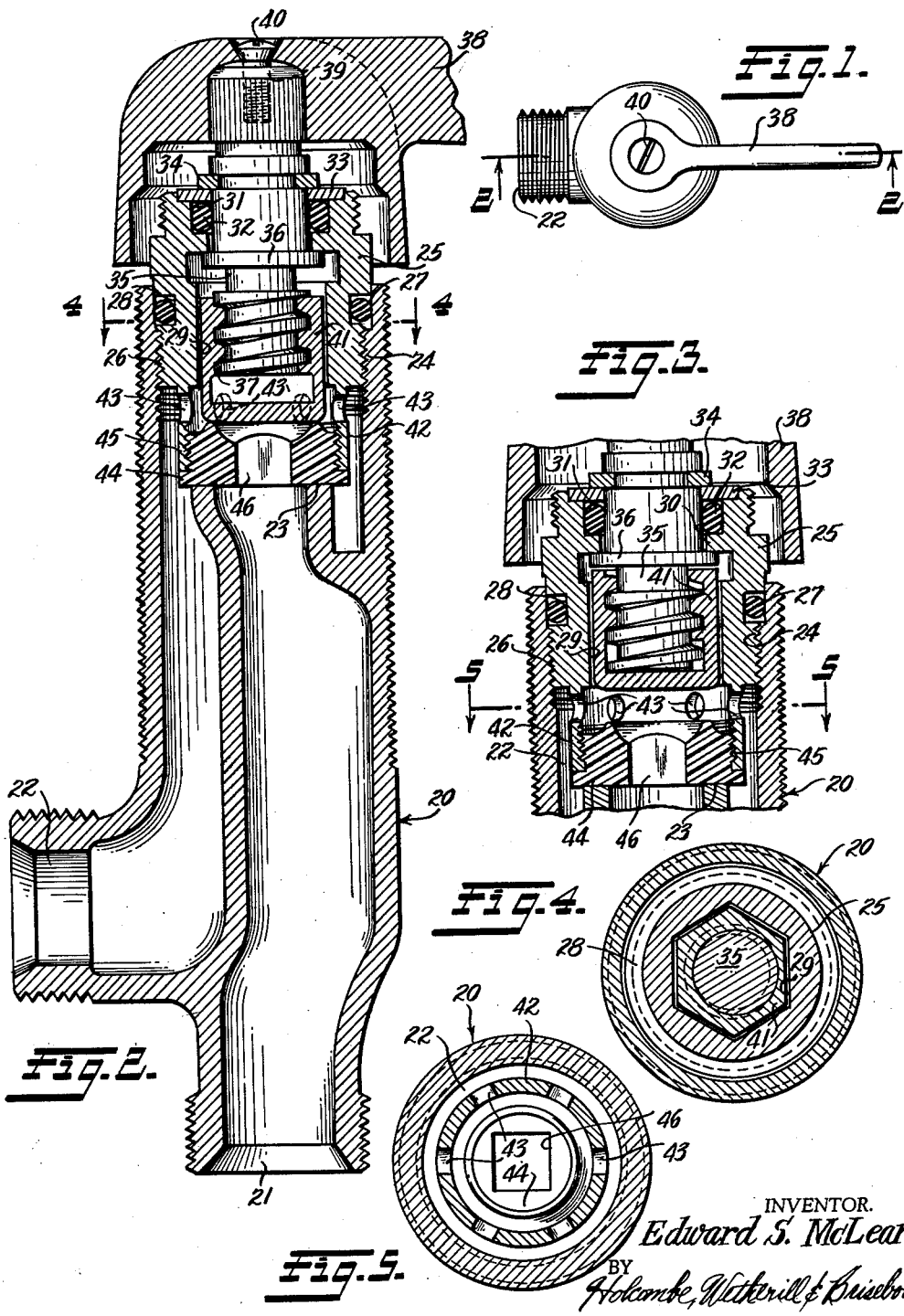

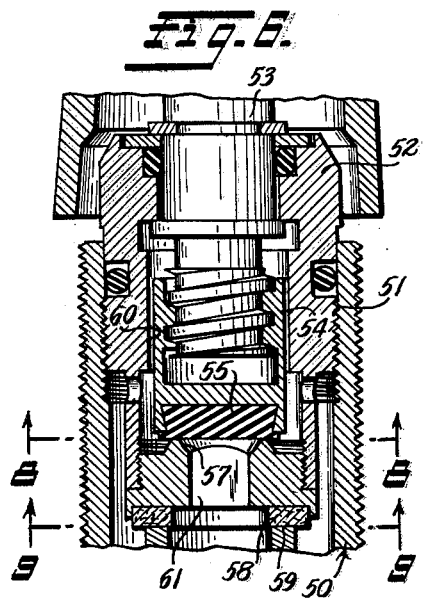
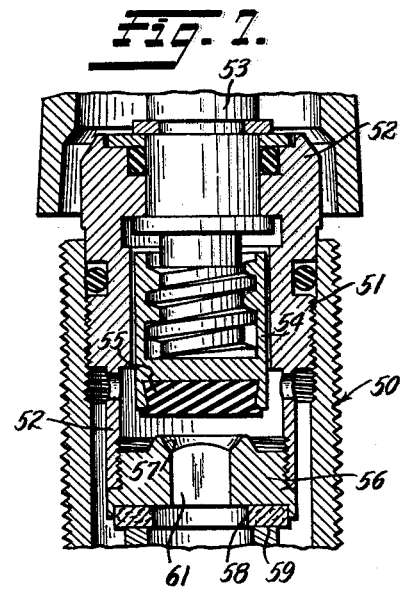
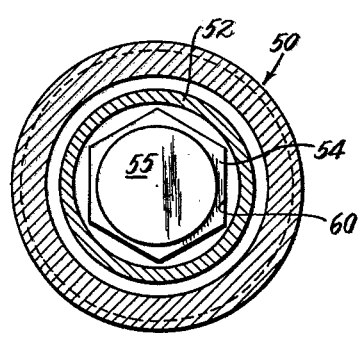
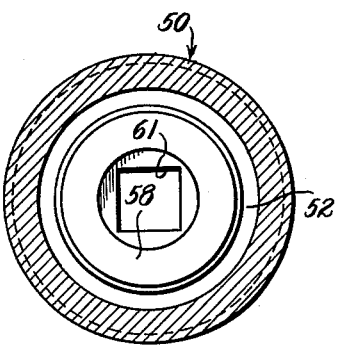
INVENTOR
*Edward S. McLean*
BY *Holcombe, Wetherill & Brisebois*
ATTORNEYS

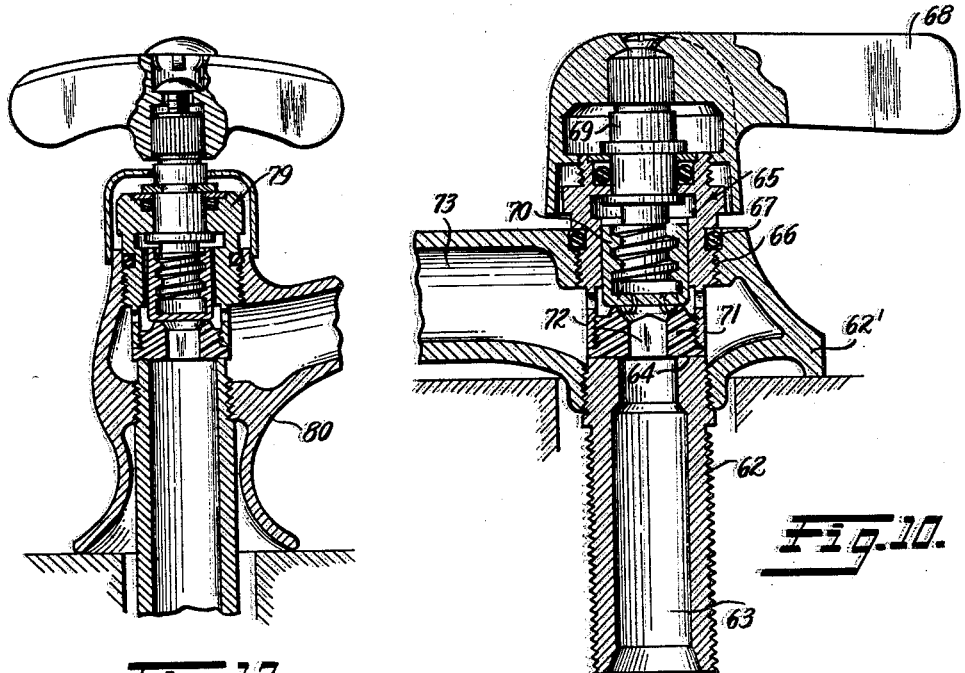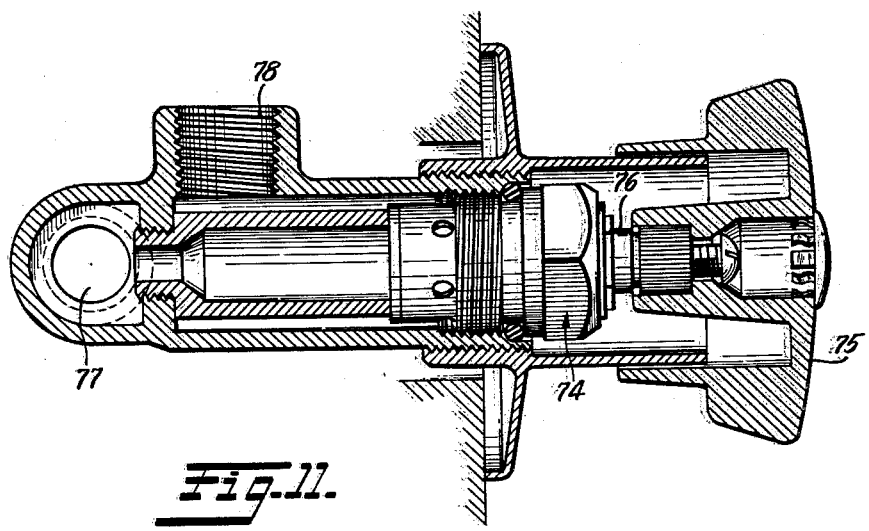

3,082,786
REMOVABLE VALVE HEAD AND SEAT UNIT
Edward S. McLean, Wilmington, Del., assignor to Speakman Company
Filed Feb. 4, 1959, Ser. No. 791,110
4 Claims. (Cl. 137—454.5)

This invention relates to a single unit carrying all the operating parts including the valve seat.

One of the most serious problems in the maintenance and repair of ordinary faucets is the fact that both the washer on the valve head and the valve seat become damaged. It is quite often necessary to replace both of these units, that is, to resurface the seat and to replace the washer and the valve head and stem carrying the washer.

The main object of the present invention is to provide an improved form of unit that may be inserted in the faucet so as to replace the valve seat, the valve stem and the head carried on this stem.

It is a further object of this invention to supply in a single unit a device that may be inserted in a valve such as an ordinary faucet to replace all of the removable parts therein.

It is a still further object of this invention to supply a device having a unitary body structure carrying all of the movable units within this structure and having an insert at the bottom thereof, this insert acting as a seal on the bottom thereof and as a valve seat on the top thereof to contact the valve head, which is mounted on a spindle in the unitary body structure.

Still another object of this invention is to provide a unitary assembly in which the body portion carrying an insert contacts and seals off the valve seat and forms a new valve seat therein and has a non-floating head mounted on a non-rising spindle therein to contact said new valve seat.

The various features of novelty which characterize this invention are pointed out with particularity in the claims annexed to and forming part of this specification. For a better understanding of the invention, however, its advantages and specific objects obtained by its use, reference should be had to the accompanying drawings and descriptive matter in which has been illustrated a preferred embodiment of the invention.

In the drawings:

FIG. 1 is a plan view of the device mounted in a lavatory valve faucet.

FIG. 2 is a sectional view on line 2—2 of FIG. 1.

FIG. 3 is a fragmentary view of the operating mechanism of FIG. 2.

FIG. 4 is a sectional view on line 4—4 of FIG. 2.

FIG. 5 is a sectional view on line 5—5 of FIG. 3.

FIG. 6 is a fragmentary view in section showing a second modification, in the closed position.

FIG. 7 is the same device shown in FIG. 6 but in the open position.

FIG. 8 is a sectional view on line 8—8 of FIG. 6.

FIG. 9 is a sectional view on line 9—9 of FIG. 6.

FIG. 10 is a fragmentary view in section, showing the device as applied to a standard deck faucet.

FIG. 11 is a view partially in section showing the device as mounted in a concealed wall valve.

FIG. 12 is a sectional view showing the device as mounted in a basin faucet.

The valve body 20 has a water inlet 21 and a water outlet 22 and a valve seat 23 therein, as shown in FIG. 2. The upper interior portion of this faucet body 20 has interior threads therein. These threads were originally intended to hold the valve head carrying the valve stem. Due to wear it sometimes becomes necessary to remove this head and resurface the valve seat 23 to take the form shown in FIG. 2.

A single unit mounting, shown in FIGS. 2 and 3, has the body portion 25 with the threads 26 on the lower exterior surface thereof which match with the threads 24 on the interior surface of the valve body. An O-ring 27 is retained within the recess 28 cut into the body portion of said unit above the threads 26, so as to retain this unit in water-tight engagement with the interior surface of the valve body. The body portion 25 has a hexagonal axial bore 29 therein, shown in FIG. 4. Above this hexagonal bore is the shoulder 30 slightly restricting the size of the bore. Above this shoulder is a recess 31 to retain the O-ring 32 which is retained in place by means of the disk 33 and snap ring 34 above the disk which retains it in position. Axially mounted in the body portion 25 is a spindle 35 having a shoulder 36 thereon. This shoulder 36 lies below the shoulder 30 and retains this spindle in position within the body and prevents its rising upon rotation. The lower end of the spindle has a thread 37 thereon. The upper end of the spindle has a series of vertical grooves cut therein to receive the handle 38, shown in FIG. 1. This spindle also has a threaded recess 39 cut in the top thereof to receive the screw 40 and retain the handle 38 in place on the spindle and the body portion. A hexagonal head 41, shown in FIGS. 2 and 4, has a screw threaded recess in the top thereof. These threads match the threads 37 on the bottom of the spindle and are received thereby. The lower part of the body portion has a depending skirt 42 thereon. This skirt has water ports 43 therein, shown in FIGS. 2 and 5. An insert 44 is fastened in the bottom of the body portion by means of threads 45. This insert has an axial opening 46 therein, shown in FIGS. 2, 3 and 5.

The single unit mounting is screwed into the valve body 20 and retained in water-tight engagement therewith by means of the O-ring 27 in the side thereof. The bottom surface of the nylon insert 44 is brought to bear against the valve body seat and forms a water-tight closure thereon. When the handle 38 is rotated in one direction it forces the valve head 41 downwardly so that the lower surface of the valve head contacts the upper surface of the insert 44 and forms a closure therewith, as shown in FIG. 2, and the water is then in the off position as this effectively closes the water inlet 21 and prevents the water from flowing through to the outlet 22. When the handle is rotated in the other direction the valve head 41 is prevented from rotating by means of the hexagonal sides of the head contacting the hexagonal sides of the bore and the spindle 35 is prevented from rising by means of the shoulder 36. This raises the valve head from its seat on the upper surface of the nylon insert 44 and allows the water in the water inlet 21 to flow through axial opening 46 in the insert. The water then flows through the water ports 43 into the water outlet 22, as shown in FIG. 3.

There is no difficulty experienced in aligning this unit as the skirt 42 carrying the insert 44 is rigidly held to the rest of the body portion and overcomes the difficulty found with separate units carrying the insert in the bottom thereof. The spindle is of the non-rising type and therefore the handle is always maintained in a level position. This facilitates the maintenance of a water-tight relationship between the spindle and the body of the unit and overcomes the usual troubles experienced with the various types of packing units necessary with a rising type spindle.

While in the above embodiment of the invention a nylon insert has been used other materials of semi-elastic nature, such as various acetal, acrylic and polyethylene plastics may be used. These withstand the corrosive effect of most water used in homes, nylon being the preferred material, giving long service under low concentration of chlorine, usually found in industrial and domestic water supplies.

Under exceptional conditions, the preferred insert has been found not to function satisfactorily, due to the nature of the water used. In order to overcome this difficulty a second embodiment of this invention is disclosed in FIGURES 6 to 9 inclusive. A valve body 50, shown in FIG. 6, has interior threads 51 therein. A replacement unit is mounted within the faucet body and has exterior threads mounted thereon to cooperate with the threads 51 to hold this unit in the faucet body. The spindle 53 is constructed and mounted in the unit body just as described in the preceding embodiment, and the valve head 54 is mounted on the lower end of this spindle. This valve head has an insert 55, in the lower face thereof, and is preferably made of some resilient material. The insert 55, shown in FIGS. 6 and 7, is held in place by means of a reverse bevel on the sides of the head 54. This insert may also be held in place by the usual means of having a threaded screw (not shown) through the center thereof, which is threaded into the metal base back of the washer in the head 54. The valve head insert contacts an insert 56 in the lower part of the body portion 52 of the unit. The insert 56 has a raised portion 57 on the upper surface thereof which acts as a valve seat and is contacted by the insert 55 in the bottom surface of the valve head 54 to form a water closure structure. The insert 56 in the bottom of the body portion of the unit 52 has a yieldable washer 58 mounted in the bottom surface thereof, which washer contacts the original valve seat 59 in the faucet body and forms a water-tight seal thereon. The valve head 54 is made from hexagonal stock and fits within the hexagonal bore 60, shown in FIG. 8, of the replacement valve unit. An opening 61 shown in FIGS. 7 and 9 allows a water passage between the water inlet of the faucet and the water outlet of the faucet (not shown).

This valve unit is operated by a handle similar to that shown in FIG. 1, and upon rotation of the spindle the valve head is forced downwardly into contact with the valve seat so that the yieldable insert 55 contacts the raised portion 57 and seals the same, as shown in FIG. 6. When the valve handle is rotated in the opposite direction the valve head rises within the unit body, the valve spindle 53 maintaining the same or relative height with respect to the body as that shown in FIG. 6. This raises the valve head from the seat and allows the water to flow therethrough, as shown in FIG. 7.

This replaceable unit is useable in all types of water controlling fixtures having the proper threads therein to receive and hold the unit against the seat. FIG. 10 shows the unit in the standard deck sink fixture or centerset base, wherein 62 and 62′ designate the faucet body having the inlet 63 at the bottom thereof and having a seat 64 above the inlet. The unit 65 is retained within the body 62 by means of the thread 66 and is retained in water-tight engagement therewith by means of the O-ring 67. A handle 68 operates the spindle 69 which causes the valve head 70 to rise and fall on the rotation of the handle. The insert 71 is a portion, and made a part of the unit 65. This insert 71 contacts the seat 64 in the valve body on its lower side and acts as a valve seat on its upper side to contact the valve head 70. This insert 71 has a water passage 72 therethrough which allows the water to flow from the inlet 63 to the outlet 73 when the valve is in the open position.

A similar mounting of the same unit 74 is shown in FIG. 11 where the unit is mounted in a concealed wall valve. The handle 75 operates the spindle 76 which causes the faucet to function in the same manner as described above, allowing the water to flow from the inlet 77 to the outlet 78 through the unit 74 when the handle is rotated to the open position.

A similar mounting of the same unit is shown in FIG. 12 where the unit 79 is mounted in a basin faucet 80 and functions in the same manner as shown in FIG. 10.

The units shown in FIGS. 2, 3, 6, 7, 10, 11 and 12 are all of the same general type and are interchangeable between any type of valve, thereby allowing the production of a standard unit which may be used on any type of manually operated valve. This facilitates the production due to the fact that no special threads or valve seats are necessary for each type of valve and allows a manufacturer to produce special valves for basins, sinks, tubs, showers etc., all using the similar movable parts mounted in one standard unit.

The repleacable valve unit may be made of the usual brass construction, but in exceptional conditions of extremely corrosive water, it has been found that the metal insert 56, shown in the second modification of this invention may be used, and this insert may be made of brass, bronze, Monel metal or stainless steel or other materials well known to withstand this corrosive action.

While in accordance with the provisions of the statute, the best forms of embodiment of this invention have been illustrated and described, it will be apparent to those skilled in the art that changes may be made in the forms of the apparatus disclosed, without departing from the spirit of this invention as set forth in the appended claims, and that in some cases certain features may be used to advantage without a corresponding use of other features.

What is claimed is:

1. A replaceable valve unit for a valve body having a seat and interior threads therein, comprising, in combination; a unitary body portion having an axial bore therethrough, having threadably mounted in the lower end thereof a yielding insert to form a water-tight seal, and having a water passage therethrough, said body portion having threads on the exterior part thereof to engage the threads in said valve body, said body portion having water ports in the sides thereof below said threads and above said insert, said body portion having interior polygonal side walls in the upper portion of said bore, and having a shoulder across the top thereof; a spindle having a flange in contact with the under part of said shoulder, said flange being smaller than said bore, said spindle having threads on the lower end thereof and means for holding it in water-tight engagement with the side walls of said bore, and a polygonal valve head mounted within the polygonal bore having interior matching threads therein mounted on the lower end of said spindle, the plane lower surface of said valve head contacting the upper surface of said insert.

2. A replaceable valve unit for a valve body having a seat and interior threads therein, comprising, in combination; a unitary body portion having an axial bore therethrough, having threadably mounted in the lower end thereof a yielding insert to form a water-tight seal on a seat, and having an axial water passage therethrough, said body portion having threads on the exterior part thereof to engage the threads in said valve body, said body portion having water ports in the sides thereof below said threads and above said insert, said body portion having interior polygonal side walls in the upper portion of said bore, and having a shoulder across the top thereof; a spindle having a flange in contact with the under part of said shoulder, said flange being smaller than said bore, said spindle having threads on the lower end thereof and being held in water-tight engagement with said side walls by means of an O-ring, a disk surrounding said spindle on the upper part thereof, and retaining means for holding said disk against said O-ring; a polygonal valve head mounted within the polygonal bore having interior matching threads therein mounted on the lower end of said spindle, the plane lower surface of said valve head contacting the upper surface of said insert.

3. A replaceable valve unit as claimed in claim 2 in which said insert is a nylon insert.

4. A replaceable valve unit as claimed in claim 2 in which said insert is of the acetal type.

References Cited in the file of this patent

UNITED STATES PATENTS

| Number | Name | Date |
|---|---|---|
| 926,885 | Lippold | July 6, 1909 |
| 1,419,650 | Sorensen | June 13, 1922 |
| 1,995,715 | Meese | Mar. 26, 1935 |
| 2,062,422 | Meese | Dec. 1, 1936 |
| 2,279,002 | MacNeil | Apr. 7, 1942 |
| 2,592,256 | Du Charme | Apr. 8, 1952 |
| 2,629,580 | Schultis | Feb. 24, 1953 |
| 2,634,944 | Waite | Apr. 14, 1953 |
| 2,646,246 | Tucci | July 21, 1953 |
| 2,701,119 | Smith | Feb. 1, 1955 |
| 2,703,584 | Mix | Mar. 8, 1955 |
| 2,784,739 | Turchan | Mar. 12, 1957 |
| 2,924,421 | Pohndorf | Feb. 9, 1960 |
| 2,994,343 | Banks | Aug. 1, 1961 |
| 3,006,361 | Reinemann | Oct. 31, 1961 |